(12) United States Patent
Hörsch et al.

(10) Patent No.: US 8,482,720 B2
(45) Date of Patent: Jul. 9, 2013

(54) METHOD AND OPTICAL SENSOR FOR THE DETECTION OF OBJECTS

(75) Inventors: Ingolf Hörsch, Freiburg (DE); Felix Lang, Schliengen (DE); Philipp Fortenbacher, Gundelfingen (DE); Gerhard Merettig, Sexau (DE)

(73) Assignee: SICK AG, Waldkirch/Breisgau (DE)

( * ) Notice: Subject to any disclaimer, the term of this patent is extended or adjusted under 35 U.S.C. 154(b) by 881 days.

(21) Appl. No.: 12/591,995

(22) Filed: Dec. 7, 2009

(65) Prior Publication Data
US 2010/0157278 A1 Jun. 24, 2010

(30) Foreign Application Priority Data
Dec. 8, 2008 (DE) .................. 10 2008 061 035

(51) Int. Cl.
*G01C 3/08* (2006.01)
(52) U.S. Cl.
USPC ......................................... 356/4.03; 356/3.01
(58) Field of Classification Search
USPC ................. 356/602, 4.03, 3.01, 3.02
See application file for complete search history.

(56) References Cited

U.S. PATENT DOCUMENTS

| | | | |
|---|---|---|---|
| 7,460,250 B2 * | 12/2008 | Keightley et al. ............. | 356/625 |
| 7,724,353 B2 * | 5/2010 | Iizuka ........................... | 356/4.03 |
| 2005/0111009 A1 | 5/2005 | Keightley et al. | |
| 2008/0137103 A1 | 6/2008 | Torii et al. | |

FOREIGN PATENT DOCUMENTS

| | | |
|---|---|---|
| DE | 197 21 105 A1 | 11/1998 |
| DE | 102 38 075 A1 | 3/2004 |
| DE | 10 2004 003 386 A1 | 9/2004 |
| DE | 10 2004 005 460 B4 | 9/2004 |
| DE | 10 2004 053 219 B3 | 4/2006 |
| DE | 10 2005 037 490 A1 | 2/2007 |
| DE | 102005041466 A1 | 3/2007 |
| DE | 10 2005 060 399 A1 | 6/2007 |
| DE | 10 2005 062 258 A1 | 7/2007 |
| DE | 10 2006 057 878 B4 | 4/2008 |
| DE | 20 2007 002 260 U1 | 6/2008 |
| DE | 10 2007 003 024 A1 | 7/2008 |
| EP | 1 496 335 A2 | 1/2005 |
| EP | 1 988 389 A1 | 11/2008 |

OTHER PUBLICATIONS

Burns, R.D., et al., "Object Location and Centroiding Techniques with CMOS Active Pixel Sensors", IEEE: Transactions on Electron Devices, vol. 50, No. 12, pp. 2369-2377, (Dec. 2003).

Hong, C.S., et al.,"Single-chip Camera Modules for Mosaic Image Sensor", Proceedings Paper, vol. 4306, SPIE, pp. 1-13, (May, 15 2001).

* cited by examiner

*Primary Examiner* — Mark Hellner
(74) *Attorney, Agent, or Firm* — Nath, Goldberg & Meyer; Jerald L. Meyer; Scott C. Langford

(57) ABSTRACT

The subject matter disclosed relates to a method for the detection of objects, wherein one transmitted light bundle is transmitted into a detection region, transmitted light reflected back from an object, when present, is detected by a receiver unit having reception elements arranged in an M×N matrix, wherein M>1 and N>1, and the distance of the object is determined by triangulation from the position of the light patch produced by the reflected light at the receiver unit. In addition to the position of the reflected light, the two-dimensional energy distribution of the received light patch within the light incident on the receiver unit is evaluated to determine further information on the object in addition to the distance of the object determined by triangulation, with a light patch quality value being determined which includes information on the homogeneity of the light reflected or remitted at the object.

14 Claims, 12 Drawing Sheets

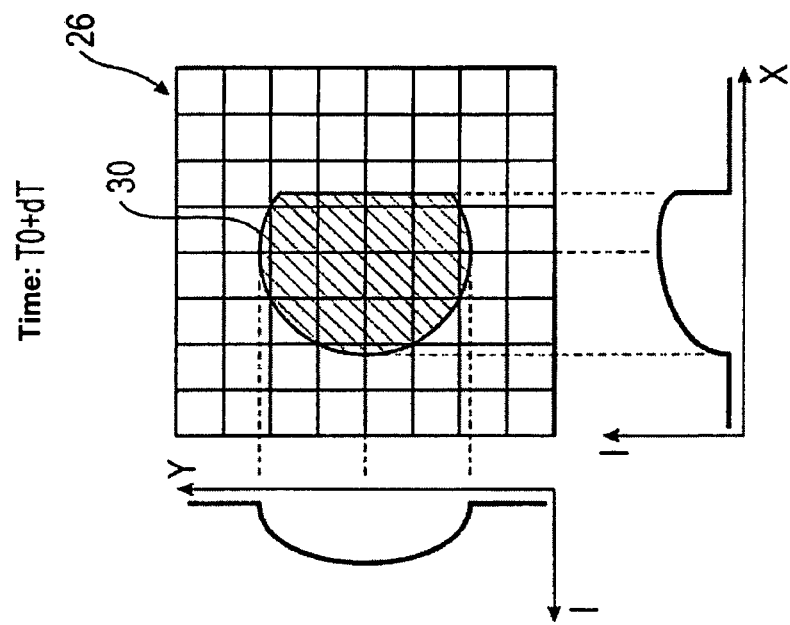
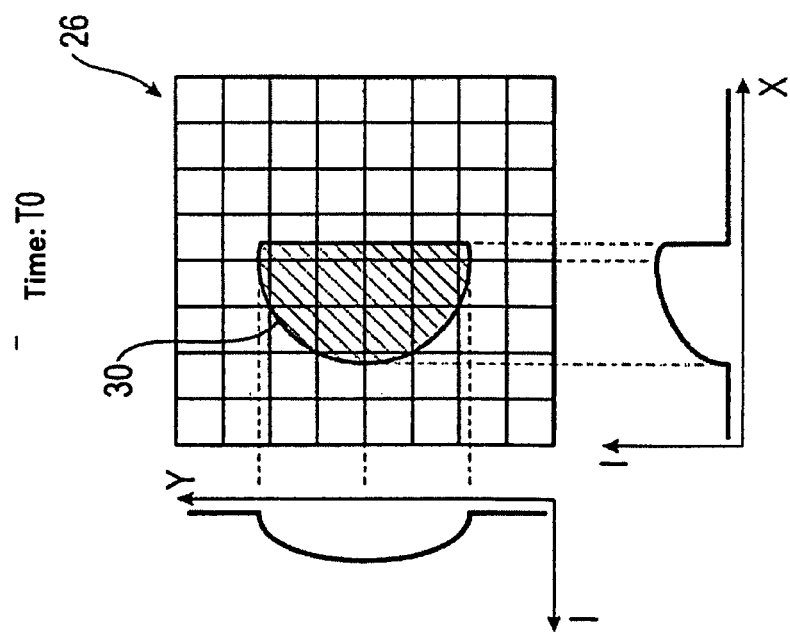

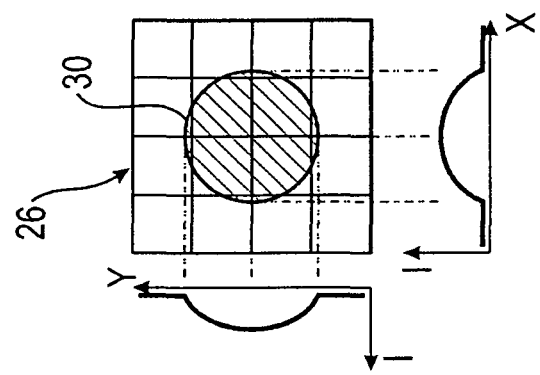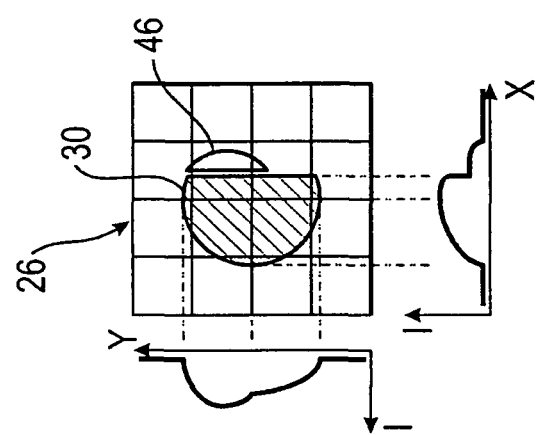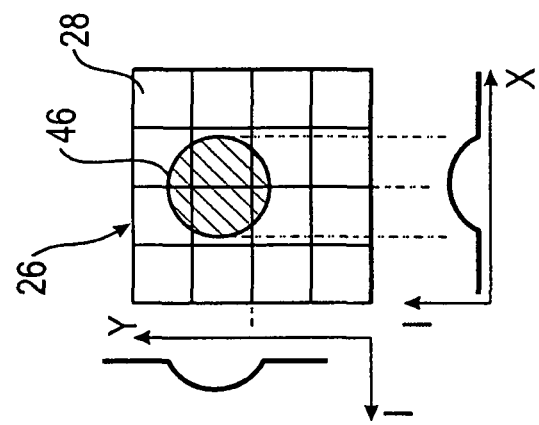

METHOD AND OPTICAL SENSOR FOR THE DETECTION OF OBJECTS

BACKGROUND

1. Technical Field

The invention relates to a method for the detection of objects in a detection region in which at least one transmitted light bundle is transmitted into the detection region and transmitted light reflected back or remitted back by an object is detected, when present, by a receiver unit, with the distance of the object being determined by triangulation from the position of the at least one light patch generated by the light reflected or remitted at the receiver unit. The invention furthermore relates to an optical sensor for the carrying out of the method in accordance with the invention.

2. Description of Related Art

It is known to determine the distance of real objects in a detection region, for example, in optical sensors using the so-called triangulation principle. For this purpose, the sensor comprises a transmission unit, for example, a light emitting diode or a laser unit having a corresponding optical transmission system, said sensor transmitting a light beam into the detection region to an object to be detected, when present there. The light reflected or remitted by such an object is detected by a receiver which comprises a receiver unit and an optical receiver system which directs the reflected or remitted light to the receiver unit. The receiver unit comprises an array of photosensitive elements in known solutions. Both the transmitter and the receiver as a rule include a corresponding optical transmission or reception system which are arranged next to one another (so called "double-eye system"). The position of the detected light on the detector changes in dependence on the distance between the sensor and the reflecting object. There is a clear geometrical relationship between the point of incidence on the detector and the distance of the detected object. An evaluation of the light distribution on the receiver array, as a rule by evaluation of the location of the center of intensity of the light patch, can therefore be used for the distance determination. Such a triangulation sensor is described, for example, in DE 197 21 105 A1.

DE 102 38 075 B4 describes a triangulation sensor having two parallel measurement channels which are formed in that two lasers transmit light in parallel into the detection region, said light being detected by two correspondingly arranged arrays of light-sensitive elements.

The above-described known triangulation process can be error-prone or bring along an imprecise scanning distance estimate under certain circumstances, in particular if the object is shiny, that is it is not of a "Lambertian" remission characteristic, or if the transmitted light bundle simultaneously detects a plurality of objects at different distances in the detection range. In addition, it can be problematic if the transmitted light bundle is defected by shiny metallic surfaces on the way to or from the object to be detected or if reflective surfaces are present in the background. Objects moving in the detection region can also be problematic, in particular if the object moves from the deep in the direction of the transmitter/receiver arrangement. Finally, it can be problematic if an object has different remission or reflection properties at different surface regions. This namely has the result that the energetic center of intensity of the reflected light deviates from the geometrical center of intensity so that the center of intensity evaluation becomes imprecise at the array of light-sensitive elements.

It is known for light barriers to transmit light through a monitored zone onto a stationary two-dimensional reflector or retroreflector. The reflected light is reflected back to a receiver again through the monitored zone. An object which is located in the monitored zone blocks the light path so that a corresponding signal can be generated. It is known from DE 10 2005 060 399 A1 for light barriers to use two-dimensional receiver arrays to be able to detect deviations from a light patch geometry which is expected when there is no object in the monitored zone.

Other systems work in accordance with the camera principle in which an image of a scene is taken and is supplied completely to an evaluation unit. Specific features, for example object shape, object location or object movement, are then analyzed and evaluated with the help of corresponding image processing algorithms to obtain information on the object located in the detection region.

DE 10 2005 062 258 A1 describes a triangulation sensor in which a distance determination in accordance with the triangulation principle is carried out. For this purpose, a multi-reception element is used on whose operation the breadth of the signal curves of the reception light patches on the multi-reception element is determined. Differently shiny objects can thus be detected reliably and optionally a printing or structuring of the object surface can be evaluated.

DE 10 2004 053 219 B3 describes an optical sensor in which the energy distribution of a light patch is evaluated at a receiver unit by column-wise or row-wise summation of the output signals.

A method for the detection of objects in a detection region having the features of the preamble of claim 1 is known from DE 10 2007 003 024 A1.

BRIEF SUMMARY

It is the object of the present invention to provide a method for the detection of objects and an optical sensor which provide a measurement of the distance and an evaluation of additional information to increase the precision and to convey additional object information.

This object is satisfied by a method for the detection of objects having the features of claim 1 and an optical sensor having the features of claim 11. Dependent claims are each directed to preferred embodiments or embodiment types.

It is in particular provided in accordance with the invention that an M×N matrix of reception elements is used as the receiver unit, where M and N are larger than one. In addition to the position of the reflected or remitted light, from which, for example, the distance the of the object can be determined with the help of triangulation by evaluation of the center of intensity, in accordance with the invention the two-dimensional energy distribution of the at least one received light patch within the light incident on the receiver unit is evaluated to be able to determine further information on the object in addition to the distance of the object determined by the triangulation. The use of a two-dimensional matrix of reception elements in this respect makes it possible that the light distribution or energy distribution is measured and evaluated in two dimensions. In this way, further information is available, in addition to the distance of the object determined by triangulation, which can be used to increase the precision of the distance measurement and/or, for example, to determine movement parameters or the surface property of the object located in the detection region. A measured value derived from the energy distribution of the light patch or a correspondingly derived measured curve can then be made available to an evaluation unit, for example, for further processing. Complex image processing algorithms are not necessary.

A particular embodiment of the method in accordance with the invention evaluates the movement of the light patch at the receiver unit to draw a conclusion on the movement status of the object in the detection region, in particular its direction of movement. It is possible in this respect by the two-dimensional matrix arrangement of reception elements not only to determined the movement of the object when its distance from the transmitter/receiver unit changes, but also in the lateral direction.

In an embodiment of the method in accordance with the invention, the contour of the light patch is evaluated to draw a conclusion on the location of the object with respect to the transmitted light bundle. It can in particular be determined by evaluation of the contour whether the transmitted light bundle is completely incident on the object.

On the other hand, a conclusion on the number of objects in the monitored zone can also be drawn from the contour of the at least one light patch.

Another advantageous embodiment of the method in accordance with the invention evaluates the light patch size at the receiver unit to draw a conclusion on the distance of the detected object from it. It is possible in this manner to obtain, in addition to the measured distance value determined by triangulation, a further estimate of the distance so that the precision of the measurement method is considerably increased. For this purpose, in particular the determined light patch size can be compared with a light patch size such as was measured with an object at a known distance and the distance can be estimated by application of physical imaging laws to the optical receiver system.

The energy distribution or the contour of the light patch received at the receiver unit is utilized in another preferred embodiment of the method in accordance with the invention to obtain information on the surface property of an object in the detection region. Inhomogeneities of the surface of the object are thus reflected in the two-dimensional energy distribution of the reflected or remitted light patch in a manner still to be described.

If, on the other hand, for example, the distance of the object is known from the triangulation evaluation, it is possible to conclude from the size of the light patch whether the object is a reflective or matte (Lambertian) target. On the other hand, with a known reflectance property of the object to be detected, when present, the light patch size can be used as described for the additional securing of the distance determination.

To obtain information on the homogeneity of the object surface, the homogeneity of the light reflected or remitted at the object is evaluated, for which purpose a light patch quality value can be determined in accordance with the invention. In this respect, it can be a case, for example, of the standard deviation of the spatial energy distribution or of the mean contrast. Such a value provides a value on the surface property without any great evaluation algorithms which can be used, for example, to be able to distinguish individual objects which, for example, have different portions of reflective regions.

It is generally possible to evaluate any individual reception element of the matrix-like receiver unit individually. It is, however, particularly economic, fast and cost-effective if the energy distribution of the light patch at the receiver unit is only determined for subsets which have more than one reception element. Such a process management is in particular suitable if objects to be detected, when present, whose distance should be determined are known, at least largely, with respect to their reflectance properties or remission properties and/or with respect to their sizes so that not the total receiver unit is of interest, but rather only a subset in which the object to be detected will be located as a rule.

An alternative embodiment provides that the energy distribution of the light patch at the receiver unit is evaluated by column-wise or row-wise summation of the output signals of the reception elements of the receiver unit. In this manner, only a very small number of individual values arises which corresponds to the number of rows or columns and which—at least with selected applications—nevertheless provides sufficient information for the identification of objects to be detected.

The method in accordance with the invention can also use structured transmitted light which is reflected or remitted, for example, at a plurality of different points of an object to be detected or which illuminates different regions of the detection region. Such an embodiment delivers additional spatial information on the location of the object or objects in the detection region or on the location of different surface regions at one or more objects.

An optical sensor in accordance with the invention has at least one light transmitter for the transmission of at least one transmitted light bundle and has at least one receiver unit which is arranged such that the transmitted light bundles reflected or remitted back from an object arranged in the detection region are incident onto the receiver unit. An evaluation unit is designed such that, in accordance with the triangulation principle, it can draw a conclusion on the distance of the object from the position, preferably from the center of intensity position, of the transmitted light reflected back or remitted back from an object in the detection region and incident on the receiver unit. In accordance with the invention, the receiver unit has a plurality of reception elements arranged in the form of an M×N matrix, with M and N each being larger than one. The at least one transmitter is made in accordance with the invention such that it generates at least one laterally extended light bundle which forms at least one light patch after reflection at an object in the detection region, said light patch being incident on a plurality of reception elements in the two lateral dimensions. The lateral dimensions in this respect designate the spatial directions which are substantially perpendicular to the transmitted light bundle.

The optical sensor in accordance with the invention has an evaluation unit which is made such that it can evaluate the two-dimensional energy distribution of the at least one light patch in addition to the position of the at least one reflected or remitted light patch to be able to determine further information on the object in addition to the distance of the object determined by triangulation.

Light sources which generate an extended light patch are possible as the light transmitters. The use of a light emitting diode is particularly economic and simple.

A CCD array or a CMOS array is particularly suitable for the receiver unit which has a matrix-like arrangement of reception elements.

BRIEF DESCRIPTION OF THE DRAWINGS

The invention will be explained in detail with reference to the enclosed Figures which represent arrangements or process managements in accordance with the invention only in a schematic representation not necessarily true to scale. There are shown FIG. 1 the schematic design of a triangulation sensor in accordance with the invention;

FIG. 4B a schematic representation of an arrangement which produces the light patch of FIG. 4a;

FIG. 7b an arrangement which produces a light patch in accordance with FIG. 7a;

FIGS. 8a and 8b examples of light patches at the receiver unit which are generated at different times by reflection or remission of the transmitted light of an object moving in the X direction;

FIG. 9b a representation of an arrangement which produces a light patch geometry in accordance with FIG. 9a;

FIGS. 10a to 10c the time curve of the light patch geometry which is produced at the receiver unit by a moving object when light is also reflected to the receiver unit without any object in the detection region;

DETAILED DESCRIPTION

Figure 1:
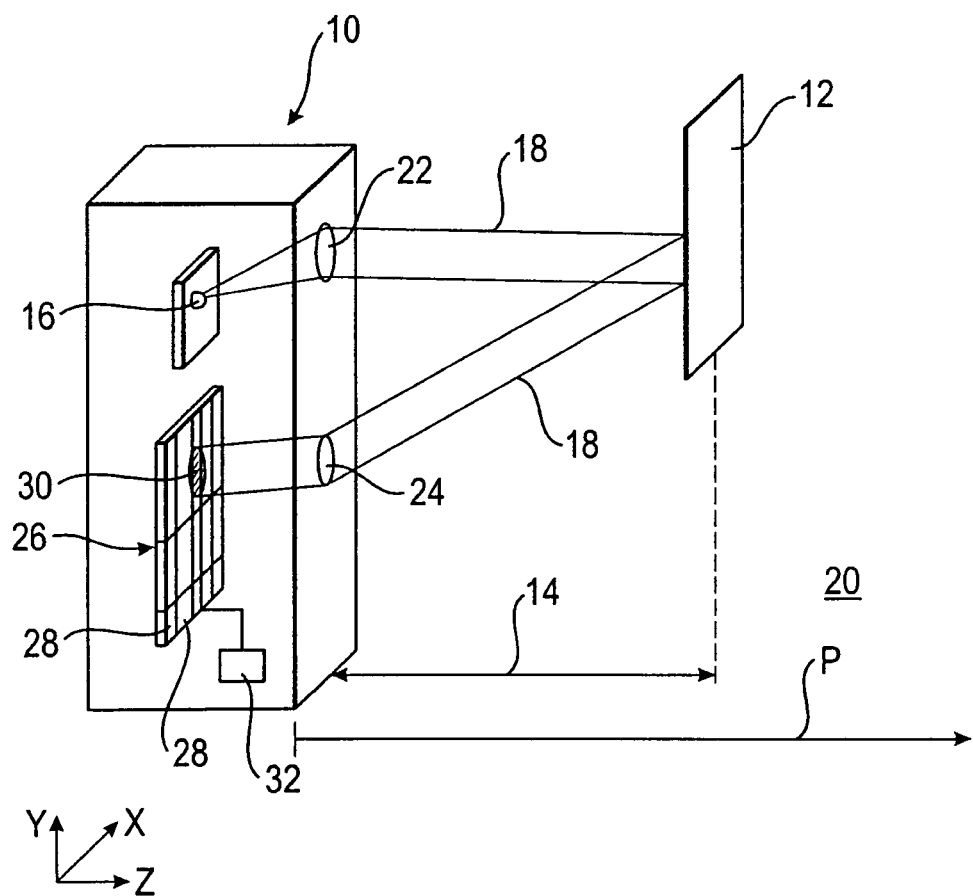

FIG. 1 shows in a schematic representation a triangulation sensor 10 which is suitable for the carrying out of a method in accordance with the invention, that is in particular to determine the distance of objects in a detection region 20 from the triangulation sensor 10. The detection region 20 extends in the representation of FIG. 1 to the right away from the triangulation sensor in the direction of the indicated arrow P. The distance of an object 12 is designated by reference numeral 14. A light bundle 18 is sent by a transmission element 16 through the optical transmission system which can, for example, include a converging lens 22, in the direction of the object 12. The transmission element 16, which is only shown schematically here, can be a light emitting diode, for example, which is arranged on a circuit board. The light 18 is reflected back or remitted back from the object 12, when present, in the detection region in the direction of the triangulation sensor 10. The light reflected back is directed onto the receiver unit 26 by the optical reception system 24. The transmission unit 16, together with the optical transmission system 22, in this respect forms the transmitter, whereas the receiver unit 26, together with the optical reception system 24, forms the receiver. The optical reception system 24 can likewise be made as a converging lens.

The receiver unit 26 comprises individual reception elements 28 which are arranged in the form of a two-dimensional matrix.

The geometry shown is a so-called double-eye geometry since the transmitter and the receiver each have a separate optical system and are arranged next to one another in a system 10. The distance of the object 12 can be determined in accordance with the triangulation principle from the distance between the transmission unit 16 and the light patch 30 formed by the reflected light on the receiver unit 26. A plurality of reception elements in the Y direction enable the determination of the center of intensity of the light patch in this direction. Objects 12 at different distances 14 in this respect generate light patches 30 with different positions in the Y direction of the indicated coordinate system.

The individual light reception elements 28 are formed, for example, by photodiodes. The total reception element can in particular be made as a CCD chip or as a CMOS chip.

As is indicated in FIG. 1, the light patch 30 is incident onto a plurality of reception elements 28 of the receiver unit 26.

The reception elements 28 are of different sizes in the Y direction of the indicated coordinate system in order to compensate the resolution of the system dependent on the distance of the object 12 in a manner known per se.

A plurality of rows of reception elements 28 are arranged next to one another in the X direction of the indicated coordinate system. There are three rows in the example of FIG. 1.

An evaluation unit 32, to which the reception unit 26 is connected for the evaluation, is likewise only shown schematically. The evaluation unit can, for example, additionally have a display or similar to display the parameters determined during operation, in particular the distance 14 of the object 12.

Figure 2:
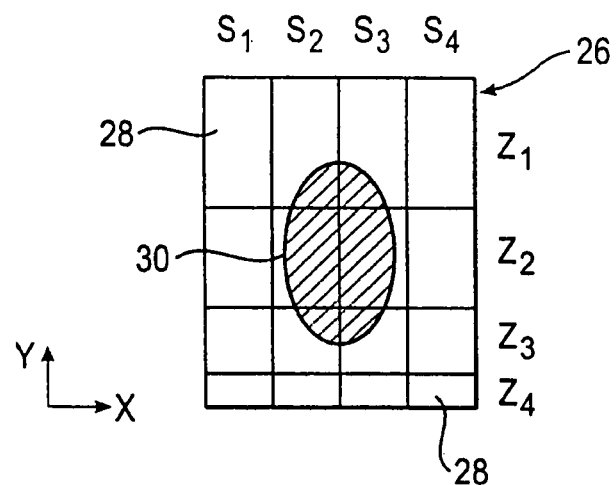
FIG. 2 an example of a light patch generated on a receiver unit after reflection at an object in the detection region.

FIG. 2 shows the plan view of an example of a receiver unit 26 of a triangulation sensor 10 in accordance with the invention in which four columns $S_1$ to $S_4$ are arranged next to one another at reception elements. The rows at the reception elements 28 are marked by $Z_1$ to $Z_4$. As already explained with respect to FIG. 1, the individual reception elements 28 are of different sizes in different rows.

The number of reception elements 28 shown in FIG. 2 and in other Figures is only to be understood schematically here and is a great deal higher in actual applications.

As is shown in FIG. 2, the light patch 30 covers a plurality of reception elements 28. The indicated oval shape results from the imaging geometry.

Figure 3:
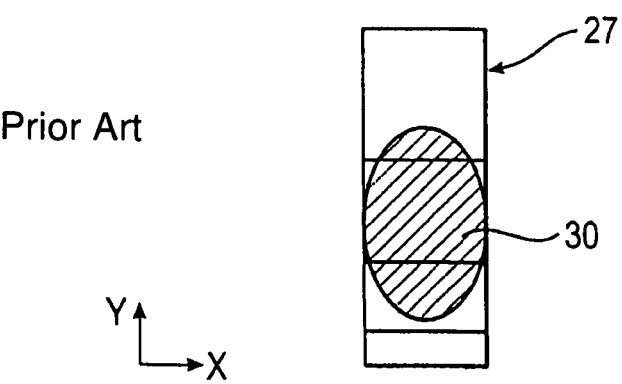
FIG. 3 for comparison, the light patch on the receiver unit of a conventional triangulation arrangement after reflection at an object in the detection region.

FIG. 3 shows, only for comparison, the receiver unit 27 of an optical sensor of the prior art which has only a single row of reception elements in the X direction.

Figure 4A:
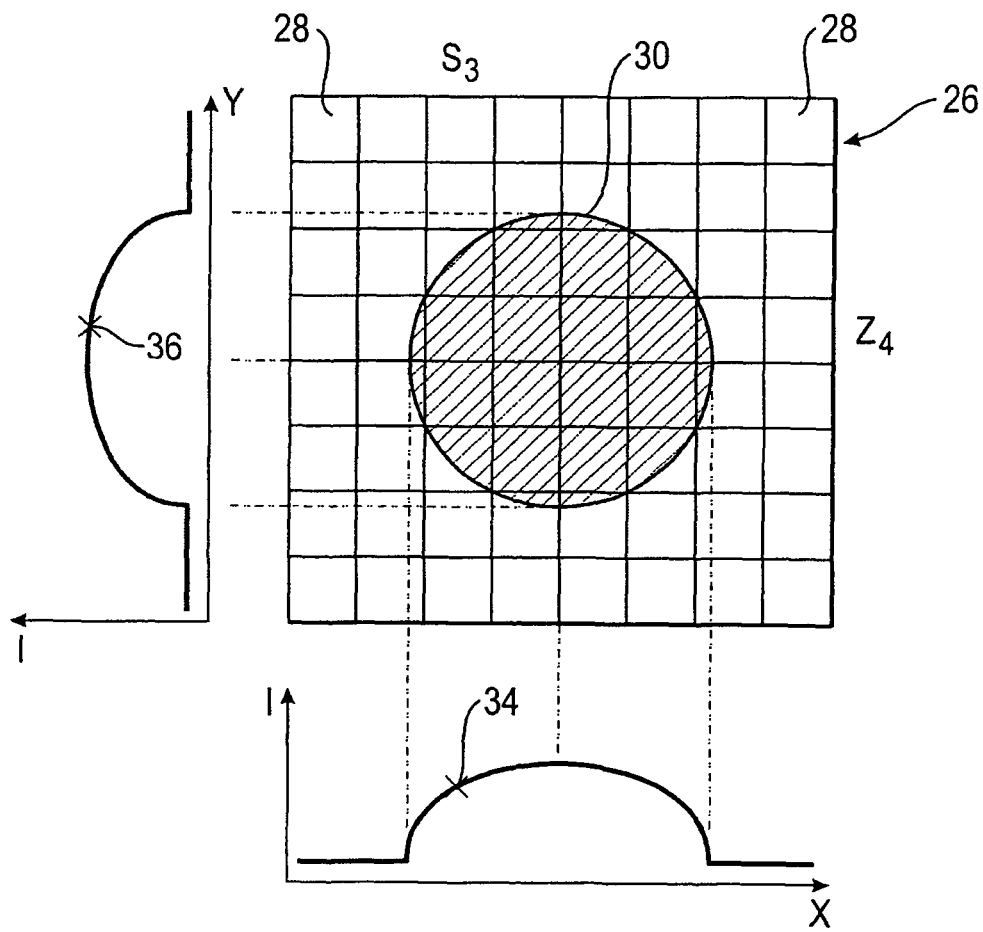
FIG. 4a the light patch on a receiver unit with a representation of the column-wise or row-wise summation of the energy values or intensity values.
Figure 4B:
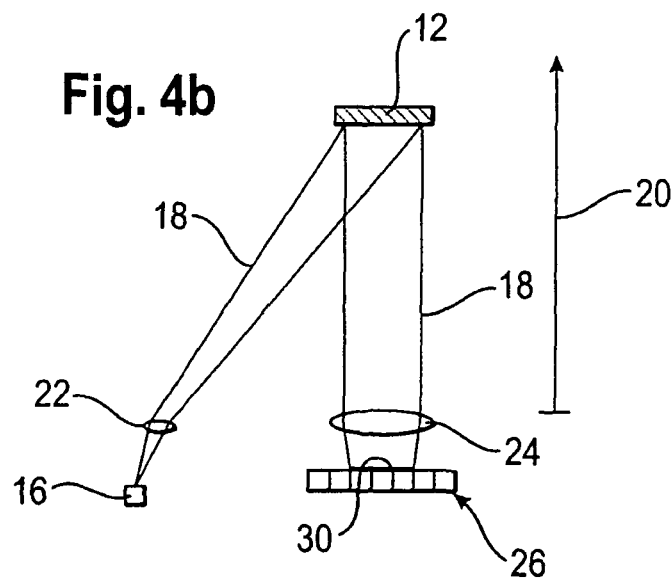

FIG. 4a shows a receiver unit 26 having reception elements 28. 64 reception elements 28 are shown here; as a rule, however, for example, CMOS chips with 64×64 reception elements 28 are used. A light patch 30 is shown such as arises on the receiver unit 26 when a matte object 12 is located in the detection region and is completely struck by the transmission light bundle 18. The corresponding geometry is shown schematically in FIG. 4b. Diagrams are shown to the side of and beneath the receiver unit 26 in FIG. 4a which show the spatial energy distribution (or the intensity distribution) in the X direction and Y direction of the coordinate system indicated in FIG. 1 in arbitrary units. These signal curves arise by summation of the individual column or row values. For example, the measured point 34 arises by summation of the output signals of the reception elements 28 in the column $S_3$ of the receiver unit 26 as it is shown in FIG. 4a. The energy value 36 in the diagram indicated at the left of FIG. 4a arises, for example, by summation of the signal outputs of the reception elements 28 of the row $Z_4$ of the receiver unit 26. It must be taken into account in this respect that the actual number of reception elements 28 of the receiver 26 is higher than the shown 64 elements so that the quasi-continuous course of the diagrams shown to the side of and beneath FIG. 4 is explained.

The columns or rows can in this respect be evaluated in a preset order or in an algorithm taking account of the previous sensor state. For example, an algorithm can thus be preset which only evaluates the column $S_2$ when the value from column $_1$ has exceeded a specific threshold.

Figure 5:
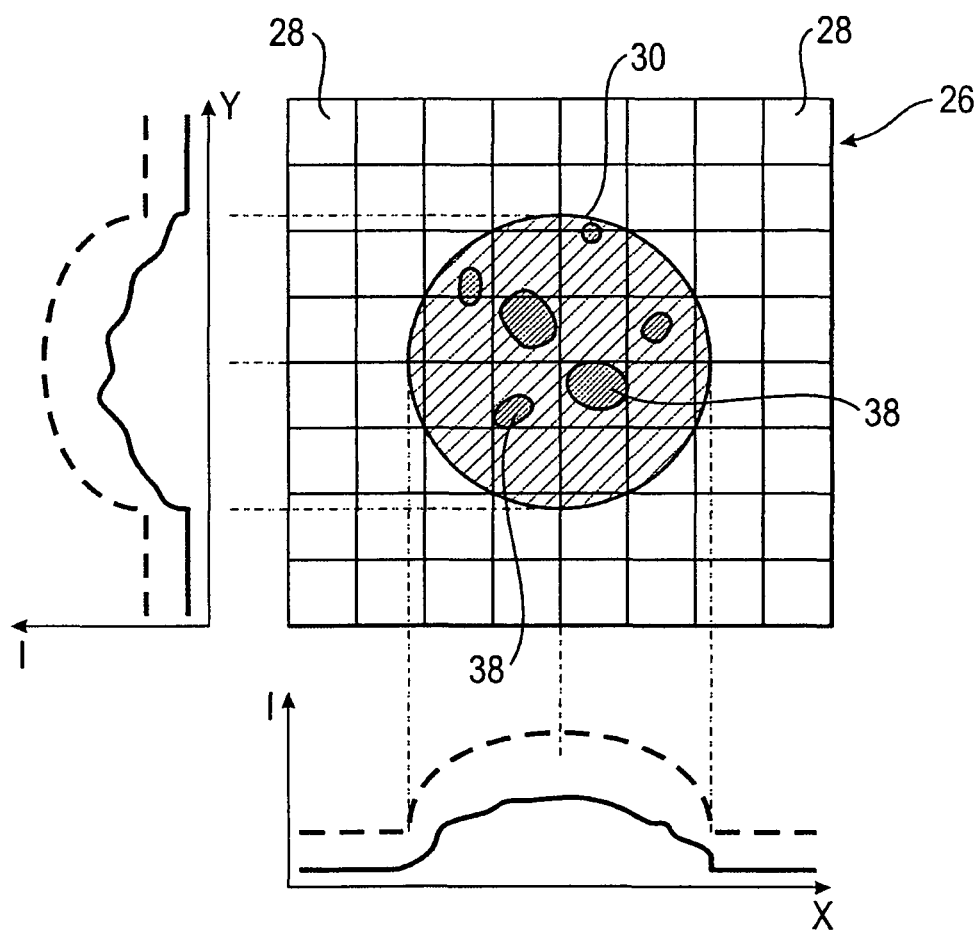
FIG. 5 an example of a light patch at the receiver unit after reflection of the transmitted light at an inhomogeneous object in the detection region.

FIG. 5 shows a receiver unit 26 having receiver elements 28 and a light patch 30 such as arises when the object 12 has an inhomogeneous object surface. This results in deviations of the homogeneous curve which are reflected, for example, in brighter spots 38 which can originate from reflective object regions of the object 12.

The energy distribution of the light patch 30 of an ideally homogeneous object 12 is shown in dashed lines in the energy distributions to the side of and beneath FIG. 5. The energy distribution and the sum signals of the individual columns and rows resulting therefrom are lower and structured (solid curves) due to the inhomogeneities.

Figure 6:
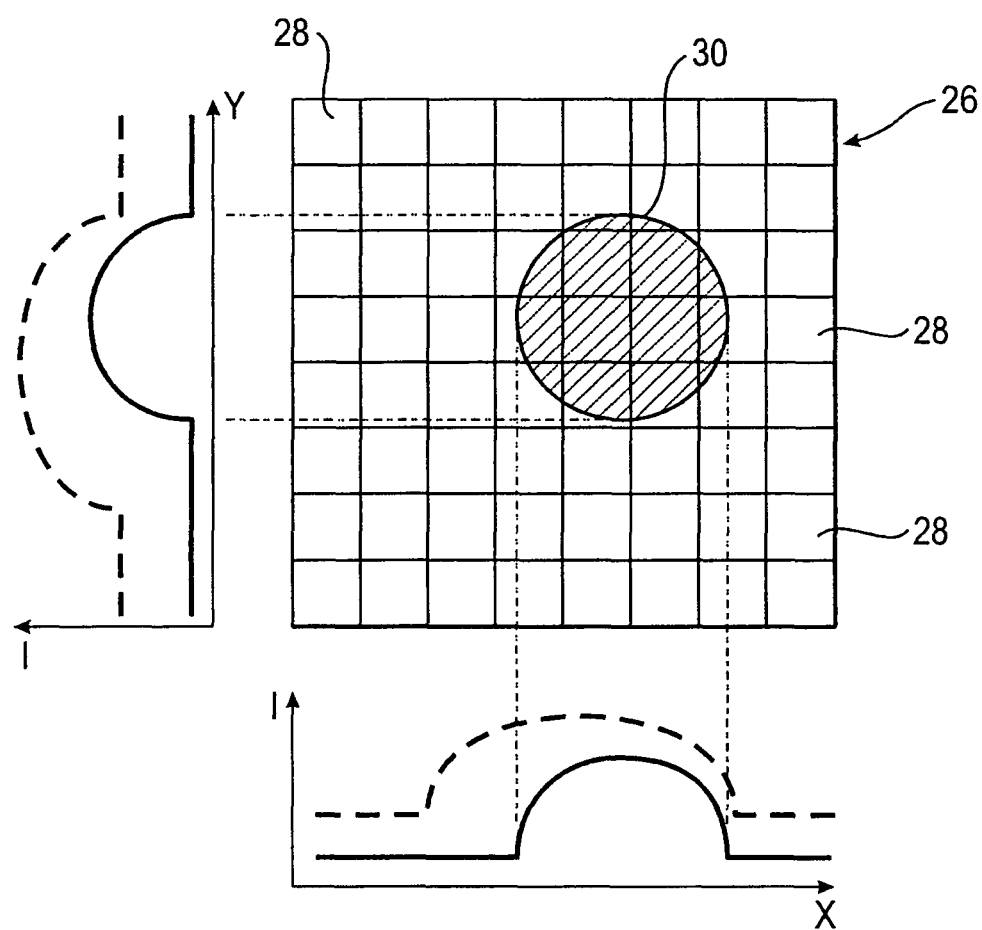
FIG. 6 an example of a light patch at the receiver unit after reflection of the transmitted light at a reflective object in the detection region.

FIG. 6 shows the receiver unit 26 having receiver elements 28 and a light patch 30 which would originate from an ideally and completely reflective object 12. Unlike in the example of FIG. 4, in which a light patch is shown which originates from a matte object 12 which is a Lambertian reflector in this respect, the light patch 30 which originates from a reflective object 12 and is shown in FIG. 6 is considerably smaller. This is due to the fact that a reflective object forms a virtual image from the doubled object distance and in this respect a smaller light patch with a limited reception aperture. This is also reflected in the energy distributions to the side of and beneath FIG. 6. For comparison, the curve is again shown in dashed lines which would occur with a light patch 30 which is made ideally matte, in accordance with FIG. 4.

Figure 7A:
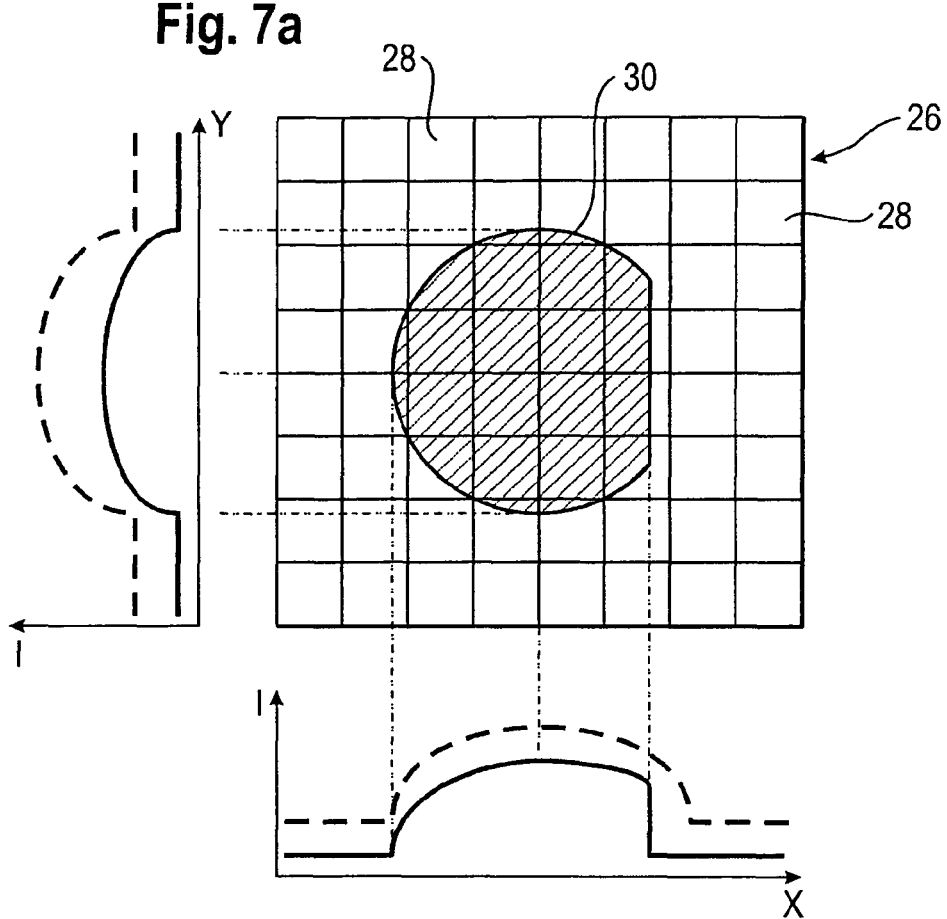
FIG. 7a an example of a light patch at the receiver unit after reflection of the transmitted light at an object which has only partially entered into the transmitted light bundle.
Figure 7B:
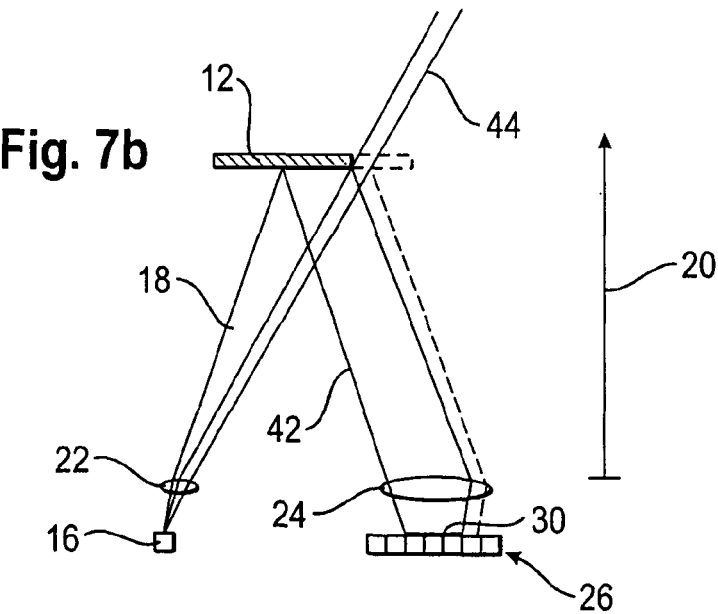

FIG. 7 shows the receiver unit 26 having the reception elements 28 with a light patch 30 such as arises when the detection object 12 has not completely entered into the transmitted light bundle 18. FIG. 7b shows the corresponding geometry. A part of the transmitted light bundle 18 passes the object 12 as a non-deflected light beam portion 44, whereas a portion 42 is reflected. The curve is shown in dashed lines which would arise if the object 12 were to completely cover the transmitted light bundle 18. The energy distribution is again indicated to the side of and beneath FIG. 7a which would arise by column-wise or row-wise addition of the signals of the reception elements 28. For comparison, the distribution is set forth in dashed lines which would result if the detection light bundle 18 were to be completely reflected by the object 12.

In a similar manner, not shown here, it can also be recognized whether there is an edge in the object which separates different reflection regions from one another.

FIGS. 8a and 8 shows similar images at a time T0 and a time T0+dT. An object is shown here which moves laterally into the detection light beam 18 in the X direction. The light patch 30 is shown on the reception element 26 such as arises when an object 12 moves laterally into the detection light beam in the X direction. A movement of the object in the direction of the triangulation sensor 10 or away from this would effect a movement of the light patch 30 in the Y direction so that such a movement can be easily distinguished form a lateral movement. In a simple manner, the speed or the direction of movement can additionally be determined when a check is made of which column or of which reception element 28 is first struck by reflected light.

Figure 9A:
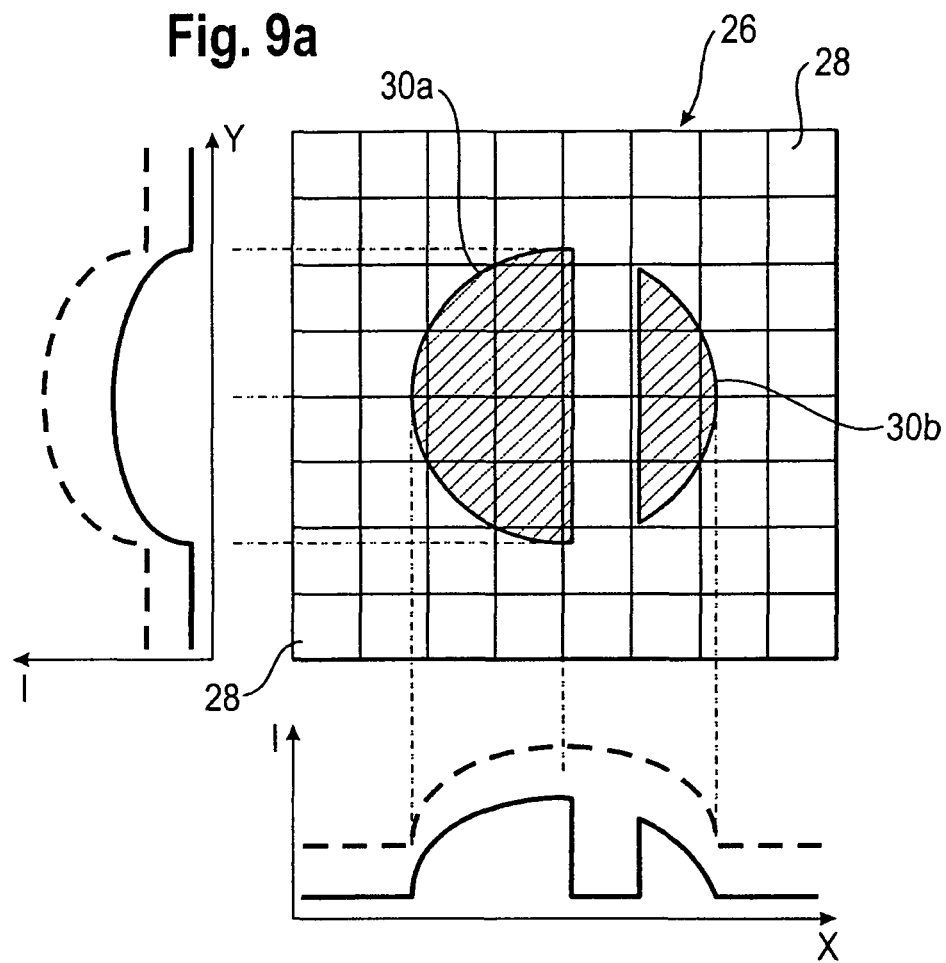
FIG. 9a an example of a light patch geometry at the receiver unit after reflection of the transmitted light at a plurality of objects in the detection region.
Figure 9B:
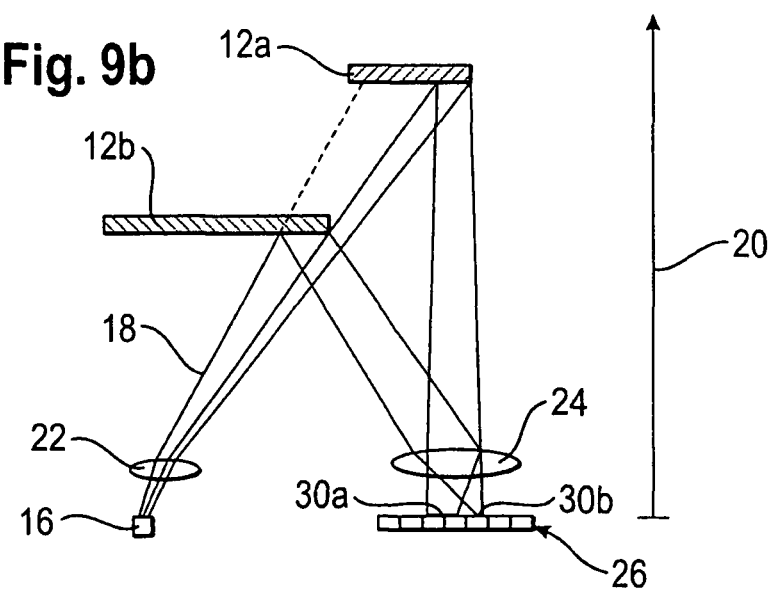

FIG. 9a shows the receiver unit 26 having the reception elements 28 on which a light patch 30 is shown which comprises two parts here. This received image can arise when two objects 12a and 12b are located in the detection region 20, as is shown in FIG. 9b. A portion of the transmitted light bundle 18 is reflected at the object 12b and produces the light patch part 30b at the receiver unit 26. Another portion of the transmitted light bundle 18 is reflected at the object 12a and produces the light patch part 30a. The energy distribution is again shown to the side of and beneath FIG. 9a such as arises by summation of the signals of the individual reception elements 28 of the columns or rows of the receiver unit 26.

FIGS. 10a to 10c show corresponding images which arise when a closure is located at the end of the detection region 20 remote from the detector. A light patch from this closure will also arise at the receiver unit 26 without an object in the detection region 20, as is shown schematically in FIG. 10a. FIG. 10b shows the state in which an object 12 moves laterally into the detection region 20 in the X direction. An image arises at the receiver unit 26 which has a light patch 30 such as is explained, for example, with respect to FIG. 7, in which a portion of the transmitted light bundle 18 is already covered by the object 12. Only a part of the light patch 46, which originates from the background, can therefore be seen in FIG. 10b. In FIG. 10c, the object 12 completely covers the transmitted light bundle 18 so that reflected light from the background no longer reaches the receiver unit. The corresponding energy distribution is again indicated to the side of and beneath FIGS. 10a to 10c which arises by summation of the column signals or of the row signals of the reception elements 28 of the receiver unit 26. It must also be noted here that the Figures are only of a schematic nature and a larger number of reception elements 28 is present so that the curve of these intensities is quasi-continuous, such as can be recognized in the representations to the side of and beneath the Figures.

Figure 11:
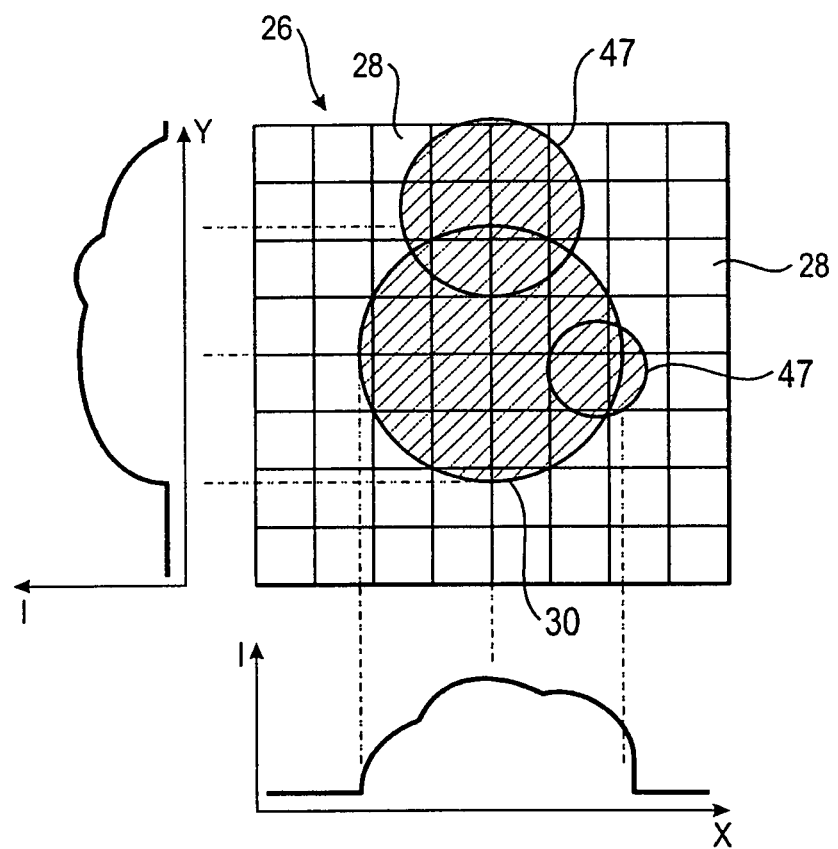
FIG. 11 the geometry of the energy distribution at the receiver unit when additional interference objects are located in the detection region.

FIG. 11 shows a receiver unit 26 having reception elements 28 with a light patch 30 such as is reflected, for example, by a matte object 12 in the direction of the receiver unit 26 (cf. FIG. 4). In addition, in this example, additional light patches 47 occur which originate from active interference elements in the detection region and result in a deviation of the expected light patch pattern.

Figure 12:
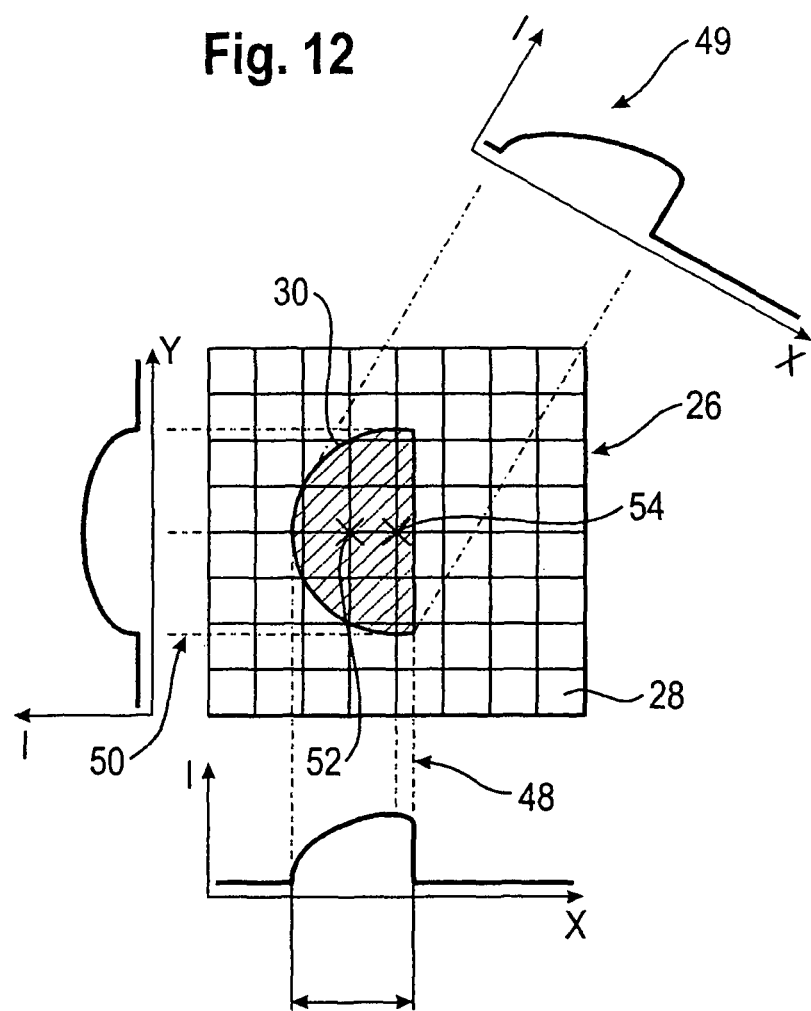
FIG. 12 a representation to explain different evaluation criteria.

FIG. 12 shows different examples of possible evaluation criteria for a light patch 30 such as is caused, for example, by an object 12 partially present in the transmitted light bundle 18 (cf. FIG. 7). The diagrams with the reference numerals 48 and 50 show the lateral projections such as were also discussed with respect to FIGS. 4 to 11. Additionally, however, for example, a non-orthogonal projection can also be taken out such as is designated by the reference numeral 49. Individual groups of elements can be combined here due to the two-dimensional arrangement of the reception elements 28 in a larger number. It is additionally possible to determine and evaluate the center of intensity 52 or the geometrical center 54.

It is finally possible that the different assessment criteria shown, for example, in FIG. 12 are matched in dependence on a fixed scheme or on an algorithms taking account of the previous sensor state.

Figure 13:
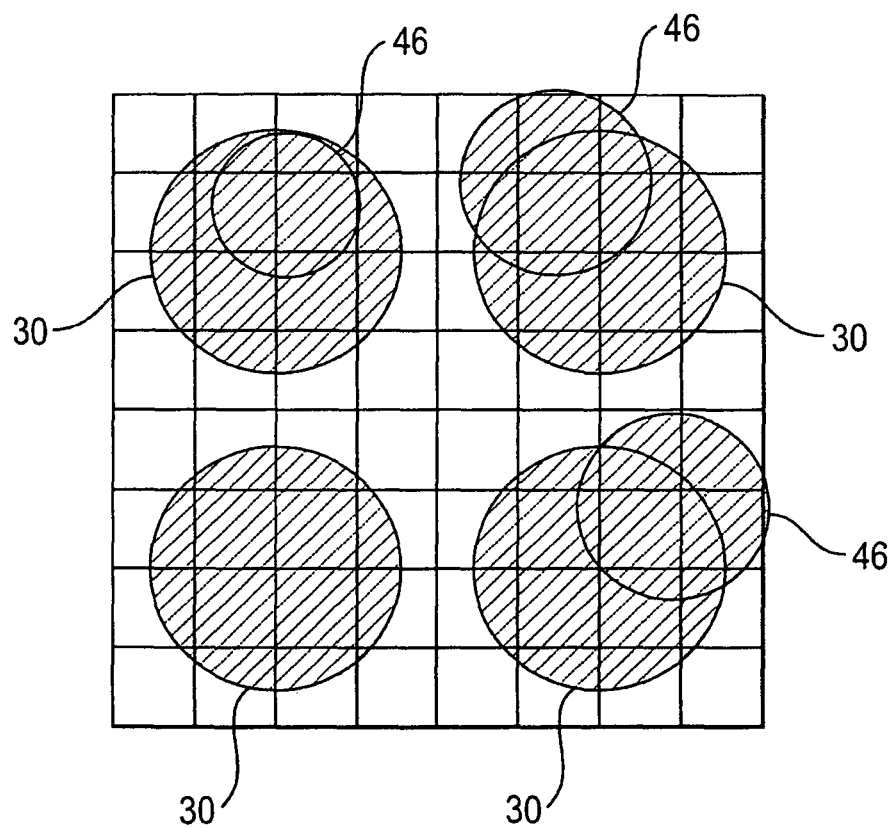
FIG. 13 an explanatory sketch for a process management in which a structured transmitted light bundle is used.

FIG. 13 shows only by way of example an application in which a structured transmitted light bundle is used which comprises a plurality of portions in this example. In a state in which no object 12 is located in the detection region 20, four light patches 30 are produced here which can be evaluated individually. Active interference elements are taken into account only by way of example here which result in additional light patches 46 such as is described with respect to FIG. 11 in the case of an unstructured simple transmitted light bundle.

The triangulation sensor 10 in accordance with the schematic drawing of FIG. 1 is used to determine by triangulation in a manner known per se the distance 14 of the object 12 in the detection region 20 of the triangulation sensor 10.

For this purpose, the position of the light patch 30 on the receiver unit is evaluated in its location in the Y direction of the indicated coordinate system of FIG. 1.

The object distance can additionally also be determined from the size of the light patch via the imaging laws of the optical receiver system to obtain a redundant measurement of the distance 14 of the object 12 from the triangulation sensor 10.

in addition, the system in accordance with the invention still provides useful information on the lateral energy distribution of the light patch 30 on the receiver unit 26, in particular in the X direction, which can be evaluated as follows, for example:

A light patch 30 in accordance with FIG. 4a produces an energy distribution in the X direction or Y direction such as are shown at the side and below in FIG. 4a. A user or an automatic evaluation unit recognizes from this energy distribution that the object is a Lambertian object which therefore reflects in an ideal matte manner. This can be determined, for example, by comparison of the size and shape of the light patch at the receiver unit 26 with comparison values. In addition to the distance information which is possible from the triangulation measurement, the user or an automatic evaluation unit is accordingly aware of the matte surface property of the object 12 introduced or entered into the detection region 20.

If the object, for example, has some reflective regions, a light patch arises at the receiver unit 26 such as is shown in FIG. 5. Such a light patch 30 is produced, for example, by an object 12 which is packed in a partially reflective packaging. Due to the two-dimensional arrangement of reception elements 28, corresponding information can be read off at the energy distributions in the Y direction and X direction, such as is shown to the side and below in FIG. 5.

FIG. 6 shows the extreme case of a light patch 30 from a completely reflective object. A reflective object generates a virtual image at the double object distance. Whereas in the normal triangulation measurement such an image would result in a displaced center of intensity, the additional information on the object property can communicate to the user or to an automatic evaluation unit, for example, by comparison with a previously carried out teaching measurement that it is a reflective object so that the assumed doubling of the distance can be taken into account.

As described, FIG. 7 shows the light patch 30 of an object 12 which has only partially entered into the transmitted light bundle 18. In this respect, the user can obtain additional location information on the object 12 due to the two-dimensional array-like embodiment of the receiver unit 26 here.

Finally, the time curve of the light patch 30 at the receiver unit 26 can be observed so that information on the direction of movement, on the speed of movement and on other movement parameters can be extracted, as is shown in FIG. 8. The person skilled in the art recognizes from a light patch pattern, as can be read off in FIG. 9a in the energy distribution in the X direction and Y direction that two objects 12a and 12b are located in the detection region 20 which have different distances from the triangulation sensor 10.

As described, the direction of movement, the speed of movement, etc. of an object 12 which produces a light patch 30 on the receiver unit 26 can be read off from a time sequence in accordance with FIGS. 10a to 10c.

An energy distribution in the X direction and Y direction, such as is shown, for example, in FIG. 11, produces the information that interference elements are located in the detection region 20 since the light patch pattern which is reflected in the energy distributions differs from a taught ideal light patch pattern, as is shown in FIG. 4.

The evaluation of the individual signals is shown by way of example in FIG. 12 for different projection directions. Groups of individual reception elements 28 are taken out and only their sum value considered with a preset detection problem or in the course of a teaching procedure. Any deviation of this sum value from an expected sum value provides the user with information on an object located in the detection region 20.

In accordance with the invention, the homogeneity of the light patch can also be evaluated, for which purpose, for example, the standard deviation or a mean contrast is determined over the area of the two-dimensional receiver unit. It is sufficient in a number of cases to compare this measured value with a previously taught measured value to enable a reliable object identification. In addition, a conclusion can be drawn from such a light patch quality value whether a signal is based on a defective evaluation.

The determined and evaluated evaluation criteria can be compared with fixed or settable/taught thresholds to derive measured signals or switch signals for the control or regulation of systems.

In another embodiment a plurality of portion of a structured light beam are used which results in a pattern such as is shown in FIG. 13, with an example being indicated here in which active interferers result in additional light patches 46 in the individual regions.

The arrangement in accordance with the invention can be used in a very versatile manner, increases the robustness of the detection and serves for the independence of in particular specific object properties, object geometries or object entry directions. Information on the movement of the object, on the entry direction, on the entry speed, on the presence of reflective backgrounds ("passive interferers") or on light source background ("active interferers") is possible in addition to the determination of the distance.

REFERENCE NUMERALS 10 triangulation sensor
12 object
14 distance
16 light emitting diode
18 transmitted light bundle
20 detection region
22 optical transmission system
24 optical reception system
26 receiver unit
27 receiver unit of the prior art
28 reception element
30 light patch
30a, 30b light patch parts
32 evaluation unit
34, 36 sum value
38 lighter regions
42 reflected transmitted light portion
44 non-deflected transmitted light portion
46 background light patch
47 interference light patches
48, 50 lateral projection
49 non-orthogonal projection 52 center of intensity
54 geometric center
$S_1$-$S_4$ columns of reception elements
$Z_1$-$Z_4$ rows of reception elements

The invention claimed is:

1. A method for the detection of objects in a detection region, wherein
 at least one transmitted light bundle (18) is transmitted into the detection region (20);
 transmitted light reflected back or remitted back from an object (12) is detected, when present, with a receiver unit (26) which has reception elements (28) arranged in the form of an M×N matrix, wherein M>1 and N>1; and
 the distance of the object (12) is determined by triangulation from the position, preferably from the center of intensity position, of the at least one light patch (30) produced by the reflected or remitted light at the receiver unit (26),
characterized in that,
the light patch (30) in two dimensions is incident on more than one reception element (28), and
in addition to the position of the reflected or remitted light, the two-dimensional energy distribution of the at least one received light patch (30) within the light incident on the receiver unit (26) is evaluated in order to determine further information on the object (12) in addition to the distance of the object (12) determined by triangulation, wherein
a light patch quality value is determined which includes information on the homogeneity of the light reflected or remitted at the object (12).

2. A method in accordance with claim 1, characterized in that a conclusion is drawn from the movement of the at least one light patch (30) at the receiver unit (26) on the movement state of the object (12) in the monitored zone (20), in particular on its direction of movement.

3. A method in accordance with claim 1, characterized in that, the contour of the at least one received light patch (30) is additionally evaluated within the light incident on the receiver unit (26) to determine further information on the object (12).

4. A method in accordance with claim 3, characterized in that a conclusion is drawn from the contour of the at least one light patch (30) on the location of the object (12) with respect to the transmitted light bundle (18) and/or on the number of objects (12a, 12b) in the detection region (20).

5. A method in accordance with claim 1, characterized in that the light patch size is evaluated at the receiver unit (26) to obtain an additional estimate for the distance (14) of the object (12).

6. A method in accordance with claim 1, characterized in that a conclusion is drawn from the energy distribution or from the contour of the at least one light patch (30) received at the receiver unit (26) on the surface property of an object (12) in the detection region (20).

7. A method in accordance with claim 1, characterized in that the standard deviation of the spatial energy distribution is determined as the light patch quality value.

8. A method in accordance with claim 1, characterized in that a subset of the reception elements (28) is observed at the receiver unit (26) for the evaluation of the energy distribution of the at least one light patch (30) at the receiver unit (26).

9. A method in accordance with claim 1, characterized in that the energy distribution of the at least one light patch (30) at the receiver unit (26) is evaluated by column-wise or row-wise summation of the output signals of the reception elements (28) of the receiver unit (26).

10. A method in accordance with claim 1, characterized in that a laterally structured transmitted light bundle is used.

11. An optical sensor for the detection of an object in a detection region, having
 at least one light transmitter (16, 22) for the transmission of at least one transmitted light bundle (18);
 at least one receiver unit (26) which is arranged such that the transmitted light bundles (18) reflected back or remitted back by an object (12) arranged in the detection region (20) are incident onto the receiver unit (26); and
 an evaluation unit (32) which determines the distance of the object (12) in accordance with the triangulation principle from the position, preferably from the center of intensity position, of the transmitted light (18) incident on the receiver unit (26) and reflected back or remitted back from an object (12) in the detection region (20),
wherein
 the receiver unit (26) has a plurality of reception elements (28) arranged in the form of an M×N matrix, wherein M>1 and N>1; and
 the at least one light transmitter (16, 22) is designed such that it produces at least one laterally extended light bundle (18) which forms at least one light patch (30) after reflection or remission from an object in the detection region (20), said light patch being incident on a plurality of reception elements (28) in both lateral dimensions (X, Y),
characterized in that
the light patch (30) in two dimensions is incident on more than one reception element (28), and
the evaluation unit (32) is designed such that it can evaluate the two-dimensional energy distribution of the at least one light patch (30) in addition to the position of the at least one reflected or remitted light patch (30) in order to determine further information on the object (12) in addition to the distance (14) of the object (12) determined by triangulation, for which purpose it is designed to determine a light patch quality value which includes information on the homogeneity of the light reflected or remitted at the object (12).

12. An optical sensor in accordance with claim 11, characterized in that the at least one light transmitter (16, 22) includes a light emitting diode.

13. An optical sensor in accordance with claim 11, characterized in that the evaluation unit (32) is designed to determine the standard deviation of the two-dimensional energy distribution of the at least one received light patch (30) as a light patch quality value.

14. An optical sensor in accordance with claim 11, characterized in that evaluation unit (32) is designed additionally to be able to determine the contour of the at least one received light patch (30).

* * * * *